United States Patent
Canova, Jr. et al.

(10) Patent No.: US 7,096,037 B2
(45) Date of Patent: Aug. 22, 2006

(54) VIDEOCONFERENCING BANDWIDTH MANAGEMENT FOR A HANDHELD COMPUTER SYSTEM AND METHOD

(75) Inventors: Francis James Canova, Jr., Fremont, CA (US); Albert H. Ting, Santa Clara, CA (US)

(73) Assignee: Palm, Inc., Santa Clara, CA (US)

( * ) Notice: Subject to any disclaimer, the term of this patent is extended or adjusted under 35 U.S.C. 154(b) by 585 days.

(21) Appl. No.: 10/159,398

(22) Filed: May 30, 2002

(65) Prior Publication Data

US 2003/0144004 A1    Jul. 31, 2003

Related U.S. Application Data

(60) Provisional application No. 60/352,785, filed on Jan. 29, 2002.

(51) Int. Cl.
*H04Q 7/20* (2006.01)

(52) U.S. Cl. .................. 455/556.1; 455/557; 455/41.2; 348/14.01; 348/14.02; 348/14.08; 348/14.1; 370/260; 370/261

(58) Field of Classification Search ............ 455/556.1, 455/572, 41.2, 557; 348/14.09, 14.02, 14.08, 348/14.1; 345/753; 370/260, 261; 709/204
See application file for complete search history.

(56) References Cited

U.S. PATENT DOCUMENTS

| | | | | |
|---|---|---|---|---|
| 4,650,929 | A | * | 3/1987 | Boerger et al. .......... 348/14.09 |
| 5,208,745 | A | | 5/1993 | Quentin et al. |
| 5,689,553 | A | * | 11/1997 | Ahuja et al. ............ 379/202.01 |
| 5,844,600 | A | * | 12/1998 | Kerr .......................... 348/14.12 |
| 5,907,604 | A | | 5/1999 | Hsu |
| 5,909,239 | A | * | 6/1999 | Lee .......................... 348/14.11 |
| 6,202,060 | B1 | * | 3/2001 | Tran .............................. 707/3 |
| 6,252,544 | B1 | | 6/2001 | Hoffberg |
| 6,332,163 | B1 | | 12/2001 | Bowman-Amuah |
| 6,345,279 | B1 | | 2/2002 | Li et al. |
| 6,346,963 | B1 | * | 2/2002 | Katsumi .................. 348/14.09 |
| 6,389,457 | B1 | | 5/2002 | Lazaridis et al. |

(Continued)

FOREIGN PATENT DOCUMENTS

GB    2313258    11/1997

OTHER PUBLICATIONS

Raychaudhuri, D. et al., "Mobile Multimedia Applications in the WATMnet Broadband Wireless System: Software Architecture and Media Processing Considerations", Signals Systems & Computers, 1998. Conference Record of the 32$^{nd}$ Asilomar Conference on Pacific Grove, CA, USA, Nov. 1-4, 1998, Piscataway, NJ, USA, IEEE, US, Nov. 1, 1998, pp. 73-77, XP010324332, ISBN: 0-7803,5148-7, p. 73-p. 75.

(Continued)

*Primary Examiner*—Joseph Feild
*Assistant Examiner*—Julio Perez
(74) *Attorney, Agent, or Firm*—Foley & Lardner LLP (57) ABSTRACT

Methods of establishing communication sessions from multiple mobile devices as well as managing available conferencing bandwidths is disclosed. One of the methods disclosed includes establishing a communication session between mobile devices and a group of conferencing servers. The method also includes checking the load of each server. Further, the method includes determining whether the load of each server is above a predetermined threshold. Further still, the method includes routing subsequent mobile devices to communicate through specified conferencing servers selected from the group of conferencing servers if the load of particular servers is above a predetermined threshold.

45 Claims, 11 Drawing Sheets

U.S. PATENT DOCUMENTS

| | | |
|---|---|---|
| 6,396,816 B1 * | 5/2002 | Astle et al. .................. 370/264 |
| 6,401,085 B1 | 6/2002 | Gershman et al. |
| 6,429,812 B1 | 8/2002 | Hoffberg |
| 6,438,585 B1 | 8/2002 | Mousseau et al. |
| 6,438,594 B1 | 8/2002 | Bowman-Amuah |
| 6,906,741 B1 * | 6/2005 | Canova et al. ............ 348/14.08 |
| 2002/0093531 A1 * | 7/2002 | Barile ........................ 345/753 |
| 2002/0138851 A1 * | 9/2002 | Lord et al. .................. 725/133 |
| 2002/0178343 A1 * | 11/2002 | Tsai et al. ...................... 712/1 |
| 2003/0149724 A1 * | 8/2003 | Chang ........................ 709/204 |
| 2003/0182425 A1 * | 9/2003 | Kurakake ................... 709/226 |
| 2003/0202494 A1 * | 10/2003 | Drews et al. ............... 370/338 |
| 2004/0203380 A1 * | 10/2004 | Hamdi et al. .............. 455/41.2 |
| 2004/0204041 A1 * | 10/2004 | Fillebrown et al. ...... 455/556.1 |
| 2005/0226172 A1 * | 10/2005 | Richardson et al. ........ 370/260 |

OTHER PUBLICATIONS

Form PCT/ISA/220 (Jul. 1998) for PCT International application No. PCT/ US 02/ 37216 dated Mar. 11, 2003.

* cited by examiner

VIDEOCONFERENCING BANDWIDTH MANAGEMENT FOR A HANDHELD COMPUTER SYSTEM AND METHOD

REFERENCE TO RELATED PATENT APPLICATIONS

This application claims the benefit of U.S. Provisional Application No. 60/352,785, filed Jan. 29, 2002, the entirety of which is herein incorporated by reference.

The present application is related to U.S. patent application Ser. No. 10/158,704 entitled SYSTEM FOR AND METHOD OF CONFERENCING WITH A HANDHELD COMPUTER USING MULTIPLE MEDIA TYPES, which is filed on the same day herewith by the same inventors and assigned to the same assignee as the present application.

BACKGROUND

The present invention relates to methods and systems associated with mobile computing devices. More specifically, the present invention relates to a system for and method of videoconferencing via a handheld computer. More specifically still, the present invention relates to a system for and method of managing bandwidth for videoconferencing using a handheld computer.

Mobile communications and computation devices come in many forms, but conventionally the designs of such mobile devices make portability versus utility compromises. For example, a watch is conventionally a very portable device, but of limited functionality. If a watch included a 20-inch monitor, for example, attached to it, the user could display, navigate, and interact with the system to a very high degree. However, in this exaggerated example, the watch would be of very low portability. Handheld computer, personal digital assistant, and mobile phone designers, among others, are especially aware of this tradeoff, especially as these devices are being asked to include more functionality and asked to carry out more sophisticated tasks. However, although the mobile devices are being asked to provide more functionality, a paramount requirement is that the device remain easily portable.

There are challenges to providing a portable device with the ability to video conference. For example, bandwidth demands for videoconferencing can be high, particularly for small, wireless devices with limited computational power.

Conventional systems and methods exist which provide video content to handheld computers. For example, PACKETVIDEO of San Diego, Calif., provides an Internet service called PVAirGuide available at http://www.pvairguide.com or http://www.packetvideo.com. The PVAirGuide service provides for streaming video-on-demand where a user can select a channel, such as news, sports, or entertainment to view video information as would be available on broadcast television or radio. PVAirGuide also provides other mobile multimedia, including a live camera application called AirCam which feeds video from a video feed to a mobile device. For example, an AirCam live stream camera can provide live shots of traffic in central London to mobile devices throughout the world. Nevertheless, PVAirGuide's streaming video-on-demand and live camera displays provide only broadcast-television type of communications. Interactive videoconferencing is not available or possible.

Accordingly, there is a need for providing highly mobile devices (e.g., handheld computers, personal digital assistants, mobile phones, and watches) with functionalities conventionally limited to less portable devices that have more rich and usable computation, communication, or interaction capabilities. There is also a need for a mobile device to provide videoconferencing communications with other portable and/or non-portable devices. Further, there is a need for systems and methods which manage bandwidth during videoconferencing communications using mobile devices and/or handheld computers.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs

SUMMARY

The present invention relates to a system for and method of videoconferencing via a handheld computer. This system and method relates to the use of a handheld computer having audio-video capturing and presentation features. By way of example, a handheld computer can be configured with a camera lens to capture and communicate video and a microphone to capture and communicate audio information. Further, the handheld computer can be configured with a display to receive and present video or data information and a speaker to present audio information. Equipped with such features and a wireless communication interface, the handheld computer of this system and method can provide a wide variety of videoconferencing features.

Another exemplary embodiment of the invention relates to a method of utilizing a mobile device in a videoconferencing session. This method can include establishing a communication session between the mobile device and a number of communication devices. The method also can include communicating video to the mobile device, and presenting the video on a display in the mobile device during the communication session.

Yet another exemplary embodiment of the invention relates to a system for utilizing a mobile device in a videoconferencing session. This system can include means for establishing a communication session between the mobile device and a number of communication devices, means for communicating video and audio to the mobile device, and means for presenting the video and audio at the mobile device during the communication session.

Still another exemplary embodiment relates to a handheld system including a central processing unit (CPU) and a storage device coupled to the CPU and having stored thereon information for configuring the CPU. The CPU can be configured to establish a communication session with a number of communication devices, communicate video and audio to the number of communication devices, and present the video and audio during the communication session.

Yet still another exemplary embodiment relates to a method of establishing a communication session for multiple mobile devices. The method includes establishing a communication session between the mobile device and a first conferencing server of a group of more than one conferencing servers. The method also includes checking the load of the first server. Further, the method includes determining whether the load of the first server is above a predetermined threshold. Further still, the method includes routing subsequent mobile devices to communicate through a second conferencing server from the group of conferencing servers, if the load of the first server is above a predetermined threshold.

Yet further still another exemplary embodiment relates to a method of conserving communications bandwidth during a videoconferencing call using a plurality of mobile devices. Each mobile device is coupled to a camera. The method includes connecting multiple mobile devices to a video conference call. The method also includes issuing a camera shut down signal to select mobile devices. Further, the method includes deactivating the specified mobile device cameras based on the camera shut down signal. Yet further still, the method includes sending video signals from mobile devices with active cameras to a plurality of mobile devices connected to the conference call.

And yet still another exemplary embodiment relates to a method of maintaining a conference call with multiple mobile devices. Each of the mobile devices is configured to communicate more than one data type during a conference call. The method includes connecting multiple mobile devices to a conference call through a conferencing server. The method also includes determining by the server, the available bandwidth for maintaining the conference call. Further, the method includes automatically disabling the access to specified data types by specified mobile devices according to the available bandwidth.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
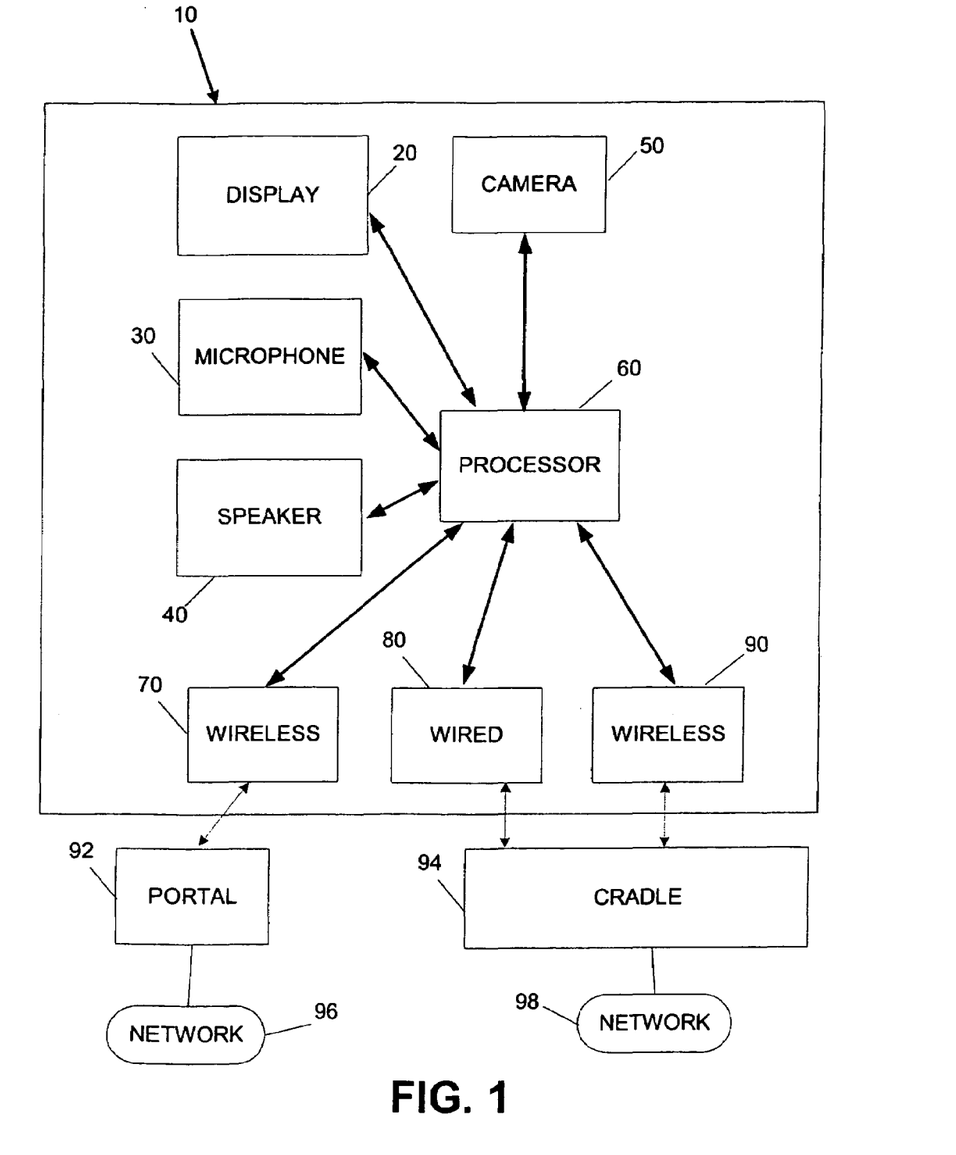
FIG. 1 is a general block diagram of a mobile device system in accordance with an exemplary embodiment.

FIG. 1 illustrates a mobile device 10 that can include a display 20, a microphone 30, a speaker 40, a camera 50, a processor 60, a wireless interface 70, a wired interface 80, and a wireless interface 90. Display 20 can be any of a variety of displays, such as, a thin film transistor (TFT) display, a liquid crystal display (LCD), a plasma display, or any other presentation device. Microphone 30 can be any of a variety of devices configured to receive audio signals. Speaker 40 can be any of a variety of devices configured to produce audio sounds. Camera 50 can be a digital camera, a video camera, or any other device for capturing images.

Processor 60 can be a circuit configured to receive signals from display 20, microphone 30, speaker 40, camera 50, wireless interface 70, wired interface 80, and wireless interface 90. Wireless interface 70 facilitates communication with a portal 92. Wired interface 80 and wireless interface 90 facilitate communication with cradle 94. Portal 92 can include a server capable of receiving wireless communications and manage communications with a network 96. Network 96 can be the Internet or any other type of network.

Wired interface 80 provides a communication link between device 10 and cradle 94 when device 10 is physically placed in cradle 94. Cradle 94 can provide connectivity to a network 98. Network 98 can include a person computer with which device 10 synchronizes data, multiple computers coupled to each other over a local area network (LAN), an intranet, the Internet, or any other type of network.

Device 10 can communicate videoconferencing information, including images and audio, to multiple participants. Device 10 can be placed in cradle 94 during the video conference such that communications are made via network 98. Alternatively, device 10 can be in wireless communication with networks via portal 92 or cradle 94. In such an embodiment, cradle 94 is capable of receiving and sending wireless communications.

Figure 2:
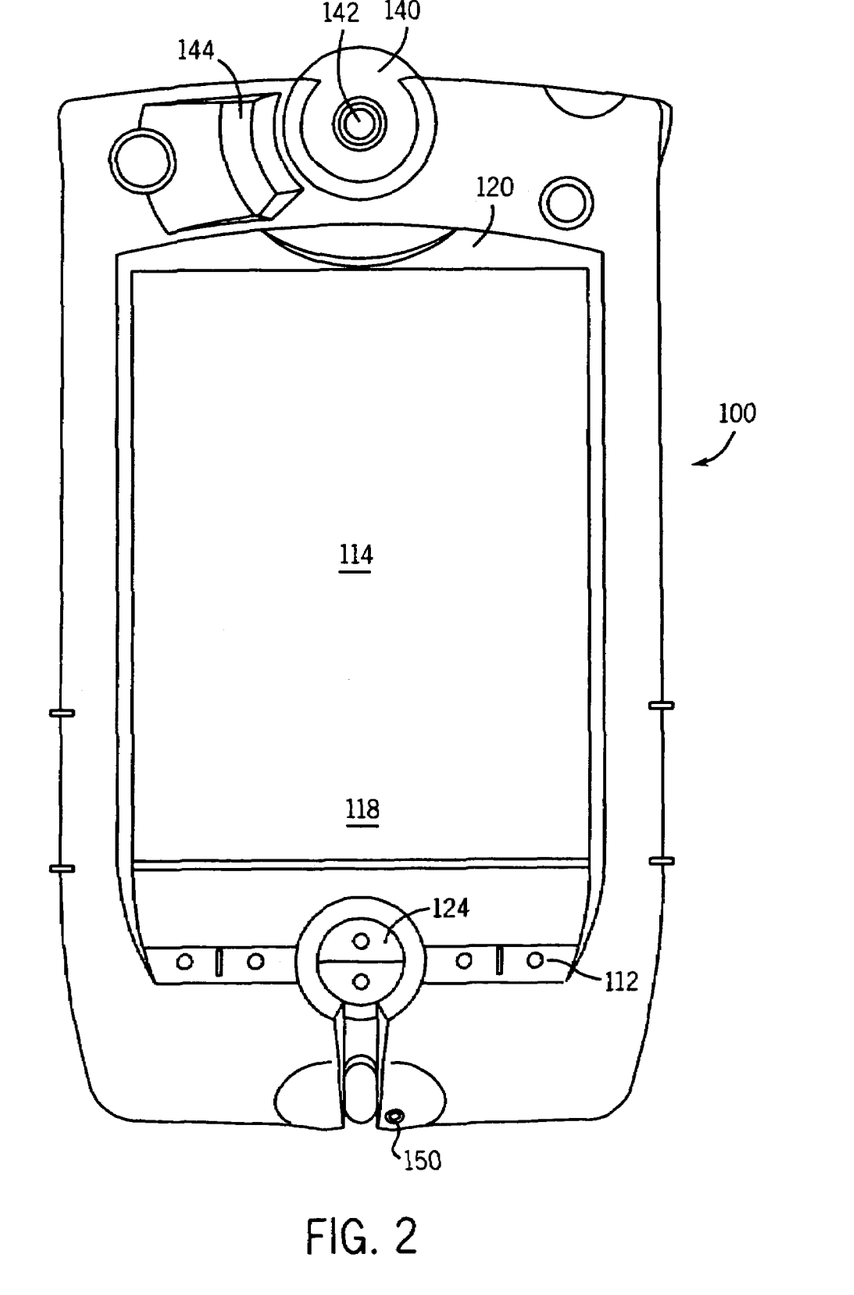
FIG. 2 is a diagrammatic representation of a mobile device in accordance with an exemplary embodiment.

Referring to FIG. 2, a handheld computer 100 is depicted according to an exemplary embodiment. Handheld computer 100 may include Palm style computers manufactured by Palm, Inc., of Santa Clara, Calif. Other exemplary embodiments may include handheld devices or personal digital assistants (PDAs), such as, the COMPAQ iPAQ manufactured by Compaq Computer Corporation of Houston, Tex., or other devices operating with the Windows CE or Pocket PC operating system sold by Microsoft Corporation of Redmond, Wash. Handheld computer 100 is representative of the type of mobile device which may use the invention disclosed and/or be part of the inventive system disclosed. Handheld computer 100 is described as "handheld" to indicate a small, portable size as compared to less portable computing devices. Handheld computer 100 can also be located on a desk, a lap, a wrist, a belt, or any other position or location.

Preferably, handheld computer 100 includes interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity, wireless messaging, e-mail, always-on e-mail, and wireless telephony.

Handheld computer 100, depicted in FIG. 2 includes a plurality of input function keys 112 and a display 114 having graphical user interface features. Display 114 may be provided with a touch screen interface that allows a user to select and alter displayed content using a pointer, such as but not limited to a stylus, a pen tip, a fingertip, or other pointing devices.

Referring again to FIG. 2, in an exemplary embodiment, display 114 also can include a GRAFFITI™ (or other handwriting recognition software) writing section 118 for entering alpha-numeric characters. A plurality of input icons for performing automated or preprogrammed functions may be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communication signals using an RF transceiver. Antenna 120 can further include an indicator light 125 for indicating the transmission and reception of wireless communication signals. Further, light 125 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, etc.

Figure 5:
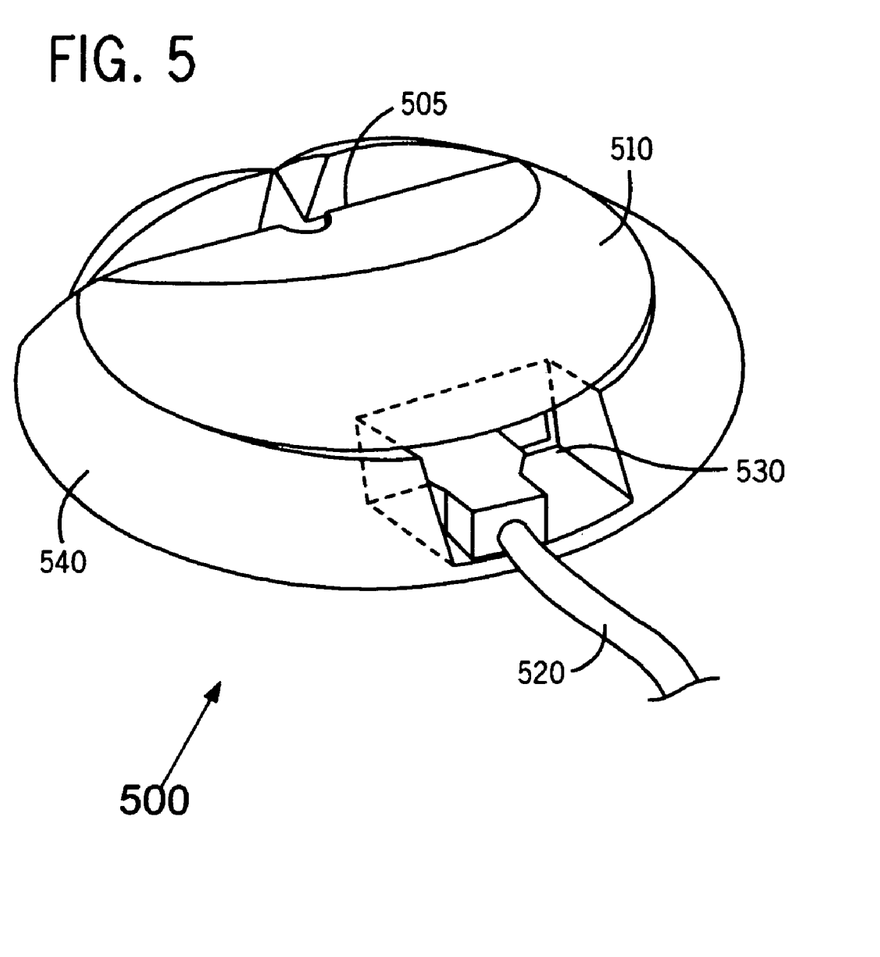
FIG. 5 is a cradle configured to receive the mobile device of FIG. 2.

In an exemplary embodiment, handheld computer 100 may be coupled to a cradle, such as a synchronization cradle 500 (FIG. 5). Cradle 500 may include a platform 510 configured to receive handheld computer 100 in a recess 505, and a data cord 520 (which, in an exemplary embodiment may be, but is not limited to, a universal serial bus (USB) cord) that may be coupled to a personal computer. In an exemplary embodiment, cradle 500 may also include a receptacle 530 for plugging in a power supply cord. In a particularly preferred embodiment, the power cord may be coupled to a wall outlet to supply power to the cradle (alternatively, the cradle may draw power through the data cord from the personal computer) for powering handheld computer 100 or for recharging the batteries of handheld computer 100. In an exemplary embodiment, cradle 500 may include a base 540 supporting platform 510. Platform 510 may be movable relative to base 540, that is, platform 510 may be tillable and/or swivelable relative to base 540. In an exemplary embodiment, cradle 500 may be used for holding handheld computer 100 in a position suitable for videoconferencing, and further, may be used as an alternative connection to a communications network for videoconferencing.

Handheld computer 100 can include a video camera 140 and a speaker 144. In an exemplary embodiment, video camera 140 includes a lens portion 142 and is formed as an integral part of handheld computer 100. Alternatively, video camera 140 can be separate from handheld computer 100 and attached as a peripheral device. Where video camera 140 is integral to handheld computer 100, lens portion 142 can be located in a recessed position.

Speaker 144 can be any of a variety of audio speakers capable of reproducing human voice communications, such as, voices of participants in a video conference. Preferably, speaker 144 is integral to handheld computer 100. Handheld computer 100 also includes a microphone 150 that is integral to handheld computer 100. Microphone 150 is configured to receive and transmit audio signals at handheld computer 100. In the example of a video conference, microphone 150 can receive and communicate the voice of the handheld user.

The locations of speaker 144, microphone 150, and video camera 140 are exemplary only. Alternative embodiments may locate speaker 144, microphone 150, and video camera 140 in a variety of different places. Likewise, the configurations (e.g., size, shape) of speaker 144, microphone 150, and video camera 140 are also for illustrative purposes only.

Figure 3:
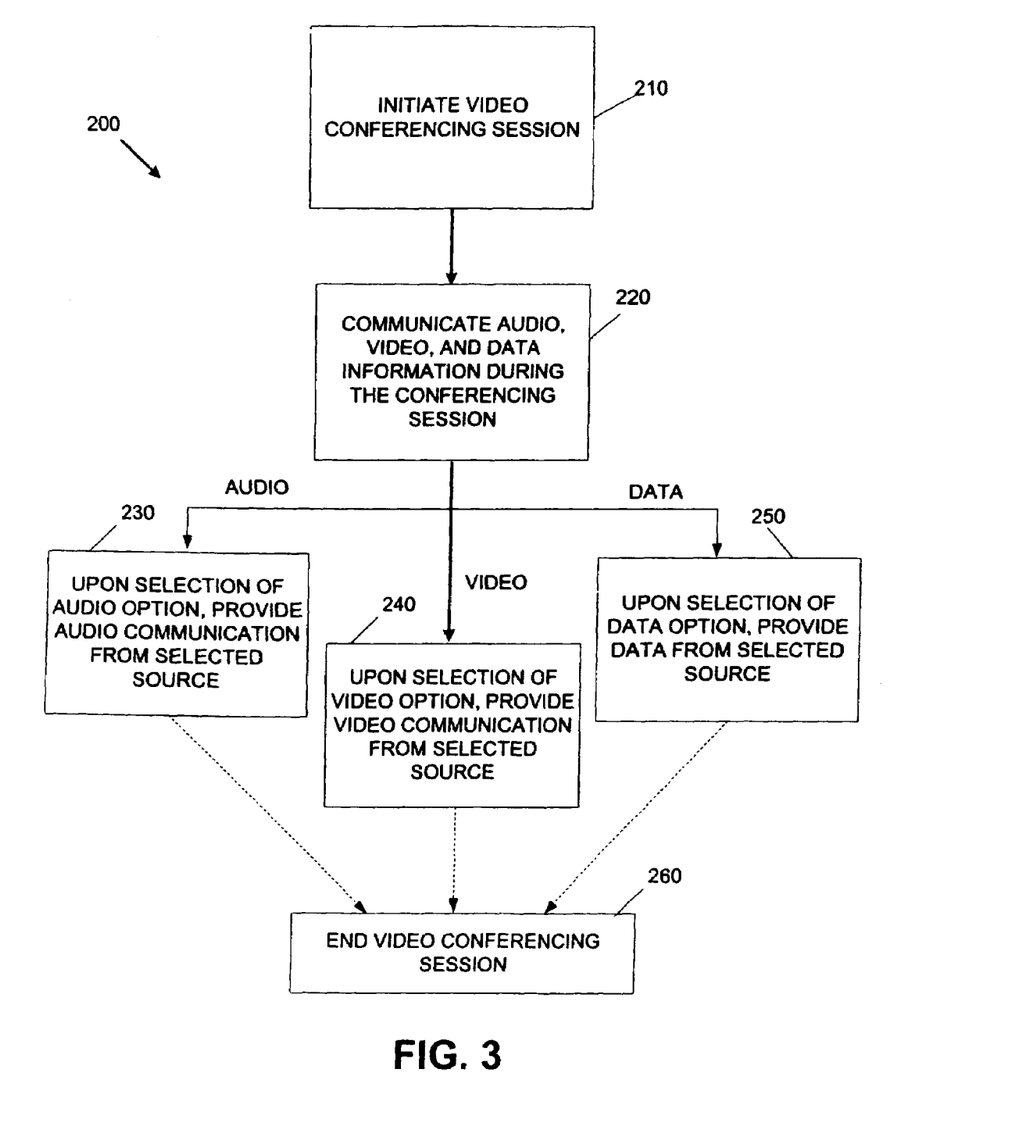
FIG. 3 is a flow diagram of a videoconferencing process in accordance with an exemplary embodiment.

FIG. 3 illustrates a flow diagram 200 depicting an exemplary method of videoconferencing via a handheld computer. Flow diagram 200 can illustrate exemplary processes of video communication utilizing handheld computer 100 described with reference to FIG. 2. In a step 210, a videoconferencing session can be initiated. In an exemplary embodiment, a videoconferencing session can be initiated by the user of a handheld computer by dialing a call-in number using an application-specific videoconferencing software program in the handheld computer. In such a program, the user can dial a videoconferencing telephone number to log in as a participant in the video conference. Alternatively, a videoconferencing session can be initiated by the receipt of a communication via wireless communication from another device. In such an embodiment, the user of a handheld computer is alerted to the beginning of a video conference and given the option to join.

After the videoconferencing session is initiated, a step 220 can be performed in which audio, video, and data information can be communicated among participants in the video conference during the conference session. By way of example, participants in the videoconferencing session can share and communicate a wide variety of different information. For example, participants can view video images of any and/or all participants to the videoconferencing session. Other video can also be viewed by participants, such as, previously stored video clips, live broadcast video, or any other visual communication. Similarly, a wide variety of audio and data information can be selectively presented and captured during the video conference.

In a step 230, a user of a handheld computer can make a selection of an audio data mode or option on the handheld computer to provide audio communication from a selected source. For example, an audio data option may be selectable from one of a plurality of input function keys 112 or input icons 151, 152, 153, 154, and 155 on display 114 and/or writing section 118 on handheld computer 100 described with reference to FIG. 2. Icon 151 returns a user to a "home" location. Icon 152 toggles a text mode or text option. Icon 153 toggles a "scribble" mode or "scribble" option, which allows a user to enter free form drawings using a stylus or other input device, or further allows a user to view free form drawings entered by other conference participants. Icon 154 toggles on a video mode or video option in which video can be received from and/or sent to other conference participants. Icon 155 toggles on an audio mode or audio option and allows the user to manipulate audio options, such as mute, etc.

An exemplary audio data option may be to present or provide audio data from a currently speaking participant during the video conference. The currently speaking participant may change from one videoconferencing participant to another depending on who is speaking at any one time. Such audio data may be delayed or streamed in a substantially real-time manner. Audio data may be used in a variety of data formats including Motion Pictures Experts Group (MPEG) formats including but not limited to MPEG3, among many other formats. Alternatively, another audio data option may be to provide audio data from all participants to the videoconferencing session. Yet another audio data option may allow the user to mute the microphone at the user's handheld computer such that audio data is not received or transmitted while mute is selected.

In a step 240, the user of the handheld computer can select a video data option to provide video communication from a selected source. A video data option can be selected using input function keys or icon 154 on the display of the handheld computer. As previously discussed, video sources during the video conference can include live video of participants of the video conference, video from other live cameras, pre-recorded video clips, or any other visual input. Such video data may be delayed or streamed in a substantially real-time manner. Video data may be used in a variety of formats including Motion Pictures Experts Group (MPEG) formats including but not limited to MPEG3, among many other formats. One video option may provide for the presentation or display of multiple windows at the handheld computer, each window display containing a different participant to the videoconferencing session. In yet another embodiment, a video option may be provided to show a currently speaking participant in one window and presentation slides or any kind of visual aid in another window. As such, participants in the video conference can view a speaker at the same time the speaker's presentation slides are viewed.

In a step 250, a user of a handheld computer, during, for example, a videoconferencing session, can select a text data option, using icon 152, to provide text data communicated from a selected source. As with the audio data option described with reference to step 230 and the video data option described with reference to step 240, the text data option can be selected using a function key or input icon 152 on the display screen. Once the text data option is selected, the user can select to present, generate, access, or receive any of a variety of different data sources. In an exemplary embodiment, text messages may be sent to all participants of a video conference or any subset of the participants. Further, text messages may be composed, sent and/or received during the transmissions of other types of data.

In a step 255, a user of a handheld computer, during a videoconferencing session can select an application data option, such as but not limited to the scribble option using icon 153, to provide application data communicated from a selected source. As with the audio data option, the video data option, and the text data option described, the application data option can be selected using a function key or input icon 153 on the display screen. Once the application data option is selected, the user can select to present, compose, access, and/or receive a combination of different data types available. For example, a participant to the video conference may desire to retrieve and/or compose application data, such as but not limited to a word processing document, a spreadsheet, a presentation slide show, an interactive sketch pad (scribble), or any other of a variety of different data files to use during the videoconferencing session.

Even though steps 230, 240, 250, and 255 are described with reference to FIG. 3 in flow diagram 200, steps 230, 240, 250, and 255 can be performed in any order, as many times, or not at all during a videoconferencing session. For example, a handheld computer user may change selections of audio (step 230) from mute to listen to all participants several times during the session. Similarly, the handheld computer user may change or toggle (or switch) between different video presentation views (step 240) during a session. For example, a user may want to switch back and forth between video images of different participants to the video conference. Further, a user may want to access any combination of data types available during the videoconference. For example, a user may wish to view and listen to a speaker, access a presentation document, and communicate with another participant via a text message, all during the conference call.

Once the videoconferencing session is over or the handheld computer user wants to end participation in the session, the videoconferencing session can be ended in a step 260. In an exemplary embodiment, the videoconferencing session can be ended by selection of an end icon or end function key on the handheld computer. Alternatively, the videoconferencing session can be ended from a remote location. A wide variety of different options may be available at the end of a videoconferencing session. For example, an option may be provided to present to each participant of the videoconferencing session for the scheduling of a next meeting using the videoconferencing equipment. Advantageously, where multiple participants to the videoconferencing sessions are using a handheld computer, such as, handheld computer 100 described with reference to FIG. 2, possible times for a next videoconferencing session can be presented to the participants based on information stored in the organizer or calendar programs included in the memory of the handheld computer.

A wide variety of other applications may be available using the functionality present with the handheld computer. For example, still photos stored in the memory of the handheld computer can easily be presented during the video conference. Similarly, documents stored in the memory of a handheld computer can be shared, reviewed, and edited by any and/or all participants to the videoconferencing session. For example, a report requiring input from multiple employees in multiple locations can be compiled by the four employees while participating in a videoconferencing session. As such, the employees can discuss, face-to-face the report while compiling and editing the report at the same time using the data option in the videoconferencing session.

Figure 4:
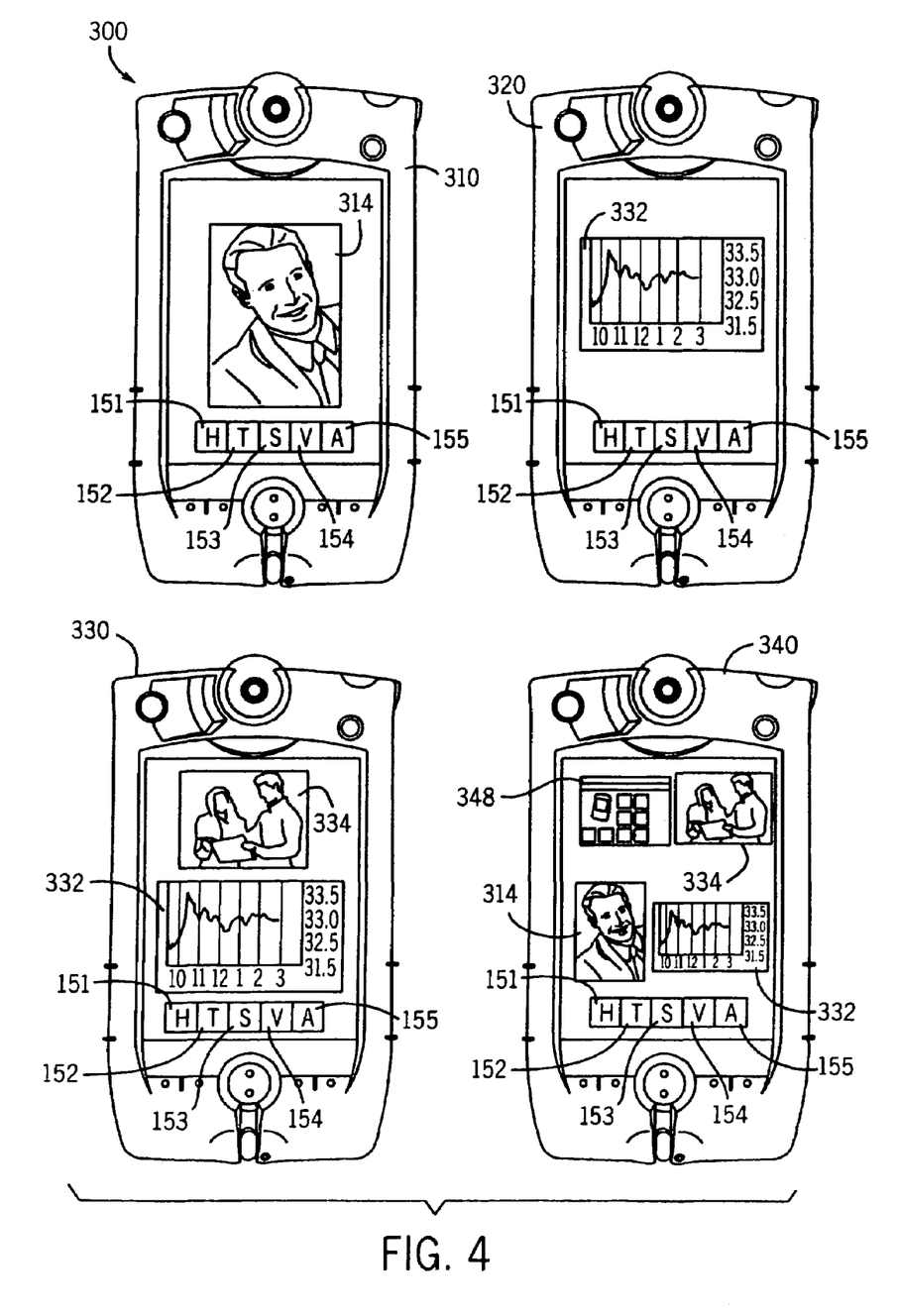
FIG. 4 is a diagrammatic representation of a video conference utilizing the mobile device of FIG. 2 in accordance with an exemplary embodiment.

FIG. 4 illustrates a videoconferencing session 300 among at least four participants. In videoconferencing session 300, a conference participants using devices 310, 320, 330, and 340 can communicate an share information. Devices 310, 320, 330, and 340 are similar to handheld computer 100 described with reference to FIG. 2.

In an exemplary videoconferencing session, a participant using device 330 can sketch a graph 332 using device 330. Graph 332 can be selectively viewed and edited by other devices in the conference while continually hearing audio from any or all of devices 310, 320, 330, and 340. In lieu of viewing graph 332 as a working document, devices in the video conference can view graph 332 as a still, non-moving graph.

By way of example, at any moment during a videoconferencing session device 310 can show a video 314 of another participant in the conference while device 320 can show graph 332 accompanying the discussion while device 330 can show graph 332 and a video 334 of conference participants. At the same time, device 340 can show graph 332, videos 314 and 334 of conference participants, and additional information, such as, a web page 348.

Advantageously, each videoconferencing session participant can selectively control content displayed at a particular device. Further, participants can participate in the creation and editing of documents as if participants were all in the same room by using devices communicating in the videoconferencing session.

Figure 6:
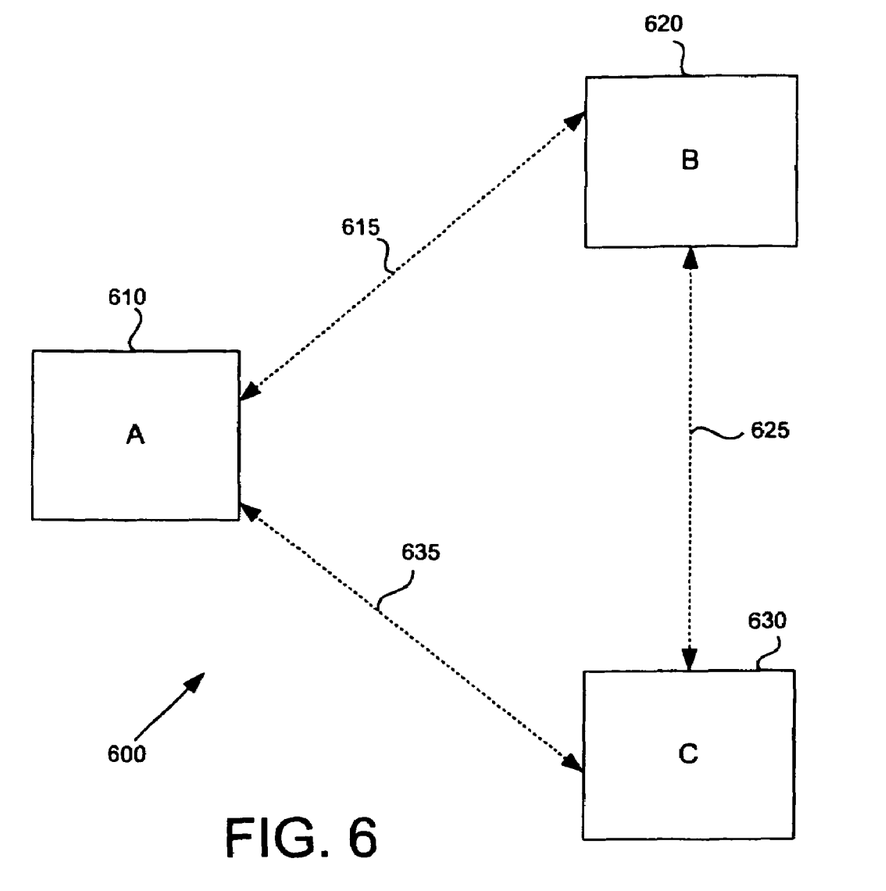
FIG. 6 is an exemplary block diagram of an ad hoc videoconferencing system.
Figure 7:
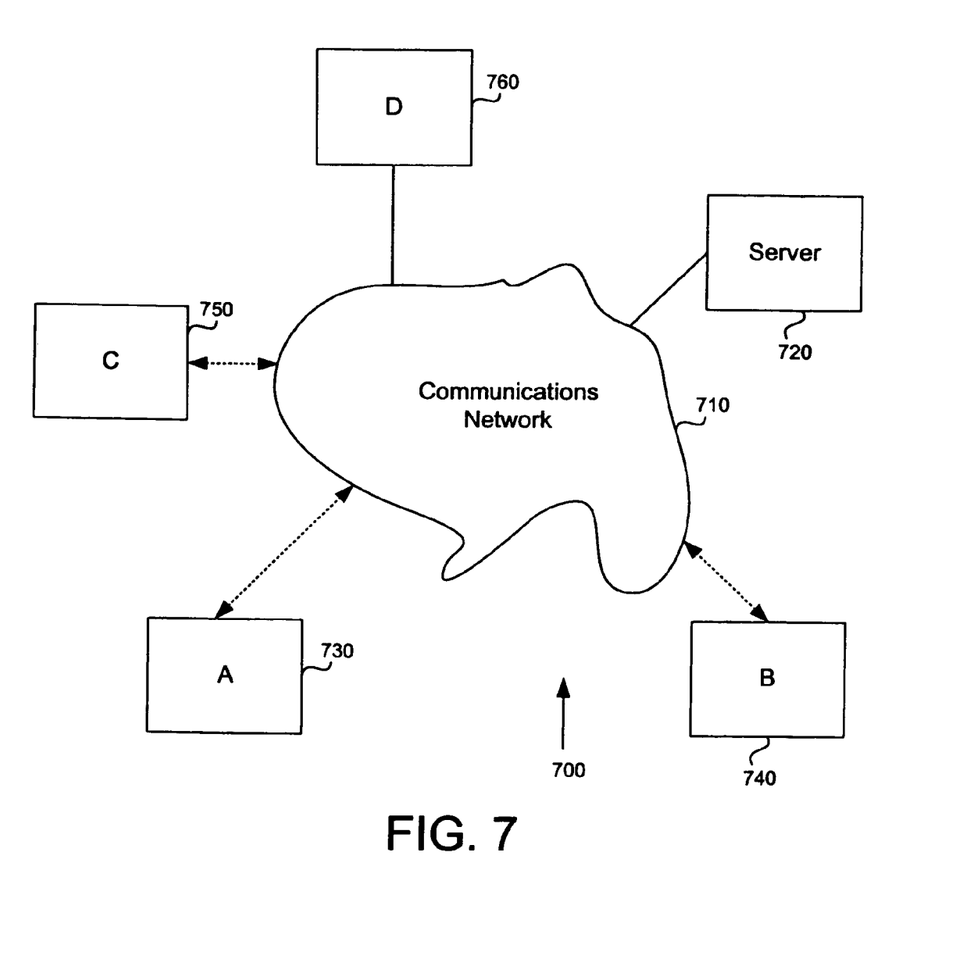
FIG. 7 is an exemplary block diagram of a fixed videoconferencing system.

Referring now to FIGS. 6 and 7, videoconferencing images, audio and data can be transmitted in a variety of different modes. For example, a wireless ad hoc network (FIG. 6), or the Internet (or other communications network, FIG. 7), can be utilized to communicate the necessary data. Ad hoc networking provides for the interaction of multiple devices using spontaneous, wireless communication between devices. In yet another embodiment, a combination of an ad hoc network and the Internet or a corporate intranet can be used for communication of the video conference.

Referring now to FIG. 6, an ad hoc network 600 is depicted. Ad hoc network 600 includes a handheld or portable device A 610, a second handheld or portable device B 620, and a third handheld or portable device C 630. Devices 610, 620, and 630 are configured with wireless transceivers such that they are able to communicate with each other over wireless links 615, 625, and 635. In such a situation, a video conference may be set up by participants using devices 610, 620, and 630 and a fixed network infrastructure is not required. Devices 610, 620, and 630 may utilize any of a variety of communications protocols including IEEE 802.11 protocols, Bluetooth, and the like.

In another exemplary embodiment, a video conference system 700 is depicted in FIG. 7. Video conference system 700 includes a communications network 710, a server 720 coupled to communications network 710, and portable devices A 730, B 740, and C 750. Further, a device D 760, such as a desktop computer, may be coupled to communications network 710 in a wired fashion, such as over a telephone line, a digital subscriber line, a T1 line, an Ethernet connection, or the like. Device D may also be a participant in the video conference with participants 730, 740 and 750. In an exemplary embodiment, devices 730, 740 and 750 may have access to communications network 710 via access points that are coupled to communications network 710. Accordingly, a video conference may be set up between devices 730, 740, 750, and 760, all communications being directed over communications network 710 and to server 720. Server 720 receives communications from devices 730, 740, 750, and 760 and sends the communications back to the participants 730, 740, 750, and 760 after coordinating and directing the information.

In yet another exemplary embodiment, system 600 and system 700 may be combined in which some of the participants communicate in an ad hoc manner and others communicate over a fixed communications network such as network 710. Such a situation is a hybrid videoconferencing system utilizing both ad hoc networking and fixed communications network infrastructure.

Figure 8:
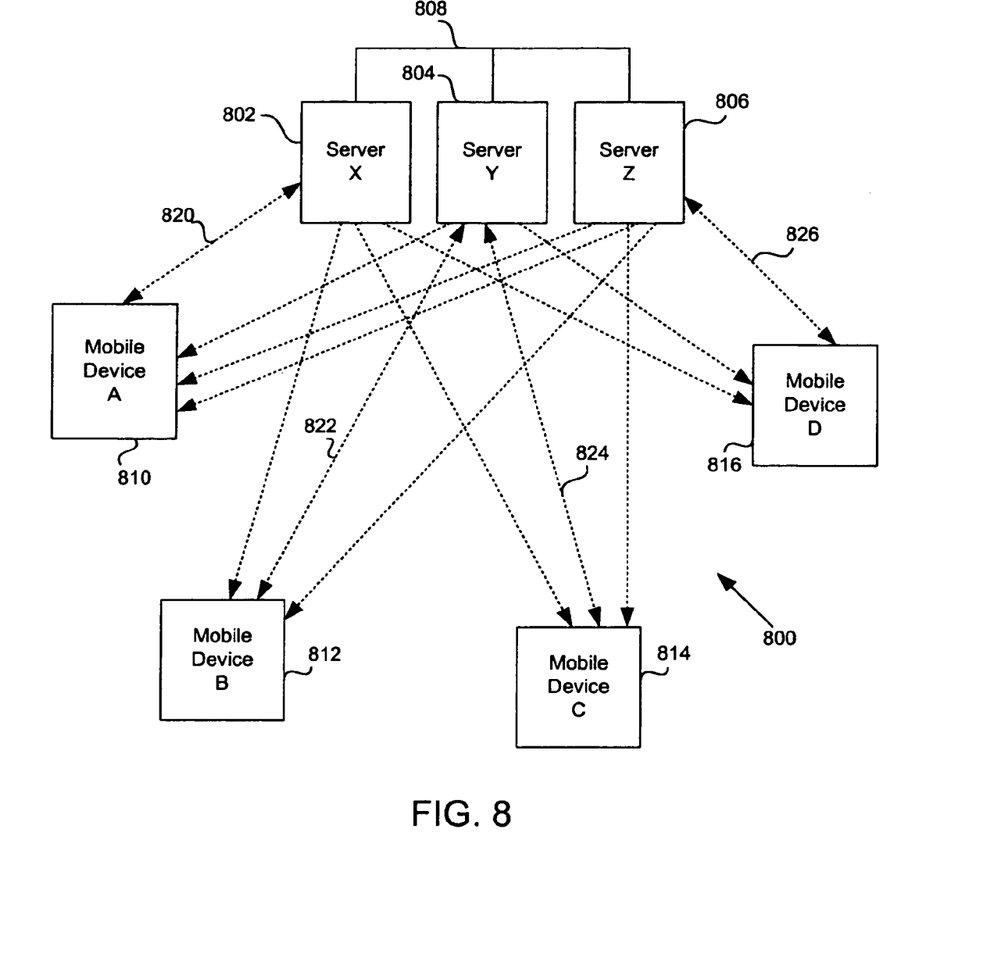
FIG. 8 is an exemplary block diagram of a conferencing system including multiple conferencing servers.

Referring now to FIG. 8, a system 800 for videoconferencing is depicted. System 800 includes a plurality of videoconferencing servers X 802, Y 804, and Z 806. In an exemplary embodiment, servers X 802, Y 804, and Z 806 may include any number of servers. Servers X 802, Y 804, and Z 806 are also configured to communicate between each other via direct connections 808 or alternatively over any type of communications network. Conferencing system 800 includes a plurality of mobile devices including device A 810, device B 812, device C 814, and device D 816. Any of devices 810, 812, 814, and 816 may be handheld computers, such as but not limited to handheld computer 100 as depicted in FIG. 2.

In an exemplary embodiment, device A 810 may establish a communication link 820 with server X 802. Device B 812 may establish a communications link 822 with server Y 804. Device C 814 may establish a communications link 824 also with server Y 804, and device D 816 may establish a communications link 826 with server Z 806. In an exemplary embodiment if, for example, device B 812 and device C 814 have established links 822 and 824 with server Y 804, and device A 810 wishes to join the conference call and attempts to link to server Y 804, the connection may be redirected to server X 802 to establish link 820 because server Y 804 has determined that the load for server Y 804 is too substantial to handle other mobile devices. Similarly, if device D 816 attempts to join the conference call via server Y 804, the connection 826 may be redirected to be established with server Z 806. Servers X 802, Y 804, and Z 806 cooperate to distribute conferencing call information to all participants, 810, 812, 814, and 816, in the conference call via a number of links. For example, each of servers X 802, Y 804, and Z 806 transmit information to each of mobile devices 810, 812, 814, and 816. By utilizing multiple servers X 802, Y 804, Z 806, each transceiver must be used to receive less information than if only a single server were used. Further, servers X 802, Y 804, and Z 806 can be used to cooperate and distribute the task of coordinating and distributing information.

In yet another exemplary embodiment, a single server may be used to transmit information to all of the call participants, thereby freeing up the other servers to only receive information from the call participants. Accordingly, limited bandwidth using transceivers on servers X 802, Y 804, and Z 806 may be conserved by utilizing multiple servers in coordinating the conference call.

Figure 9:
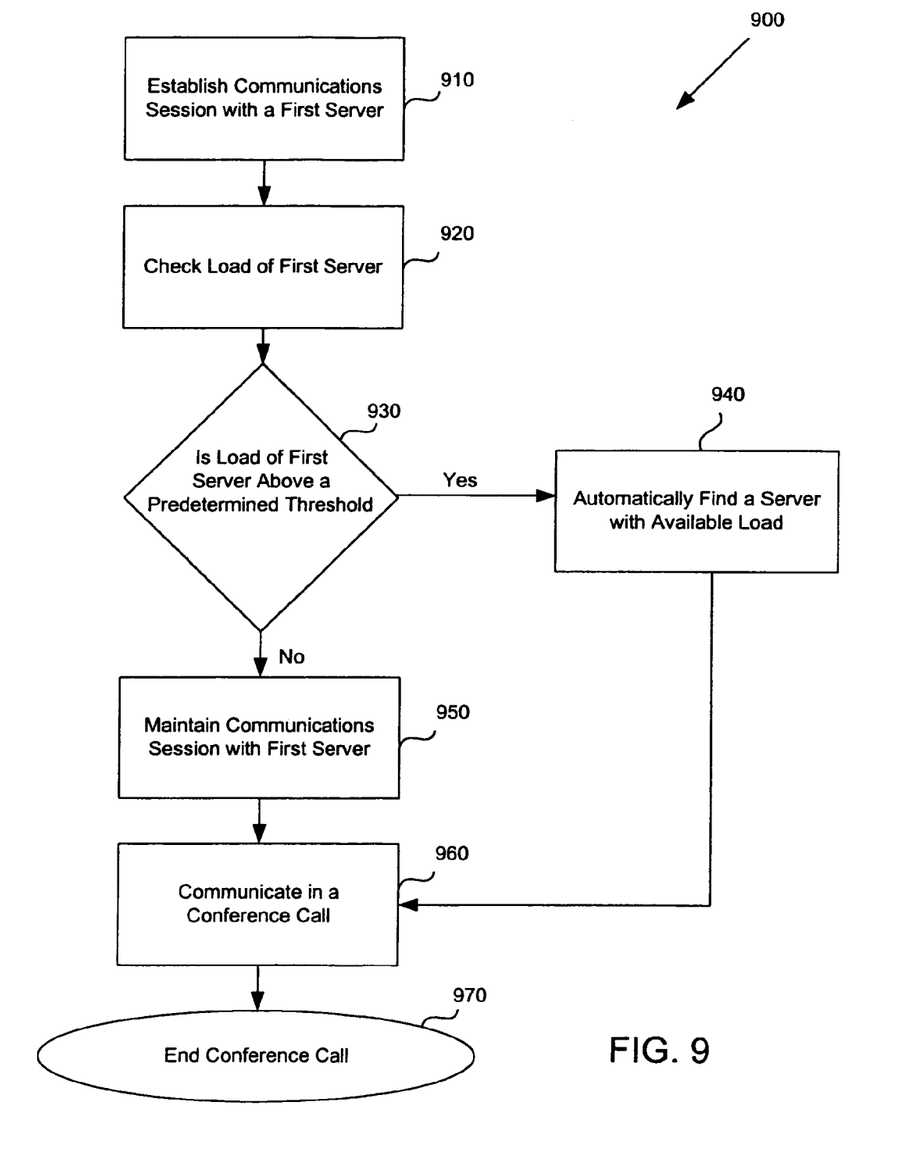
FIG. 9 is an exemplary process diagram depicting a method of managing bandwidth during a conference call.

Referring now to FIG. 9, a process 900 utilizing the architecture of system 800 or similar architecture is depicted. In process 900, a communications session with a first server is established (step 910). The load of the first server is then checked (step 920). It is then determined whether the load of the first server is above a predetermined threshold (step 930). If the load of the first server is above a predetermined threshold a server is then automatically found that has available load or load capacity (step 940). However, if the load of the first server is not above a predetermined threshold, a communications session with the first server is established and maintained (step 950). Once the participants find an available server and are communicating with an available server, the participants may then communicate in a conference call (step 960). Once the conference call has been completed the conference call is then ended (step 970).

Referring again to FIG. 8, mobile devices 810, 812, 814, and 816 may communicate to servers X 802, Y 804, and/or Z 806 via any of a variety of communication methods including, but not limited to wireless communications methods such as IEEE 802.11 methods, Bluetooth methods, as well as through wired connections such as, but not limited to Ethernet connections. The tasks of managing a conference call using a plurality of mobile devices and at least some of which are connected over wireless links is distributed amongst a plurality of servers in an effort to conserve bandwidth, and/or create excess bandwidth that may be used by the mobile devices, especially in a situation in which the wireless connections or wireless transceivers which are being used by servers X 802, Y 804, and Z 806 may be substantially limited.

Figure 10:
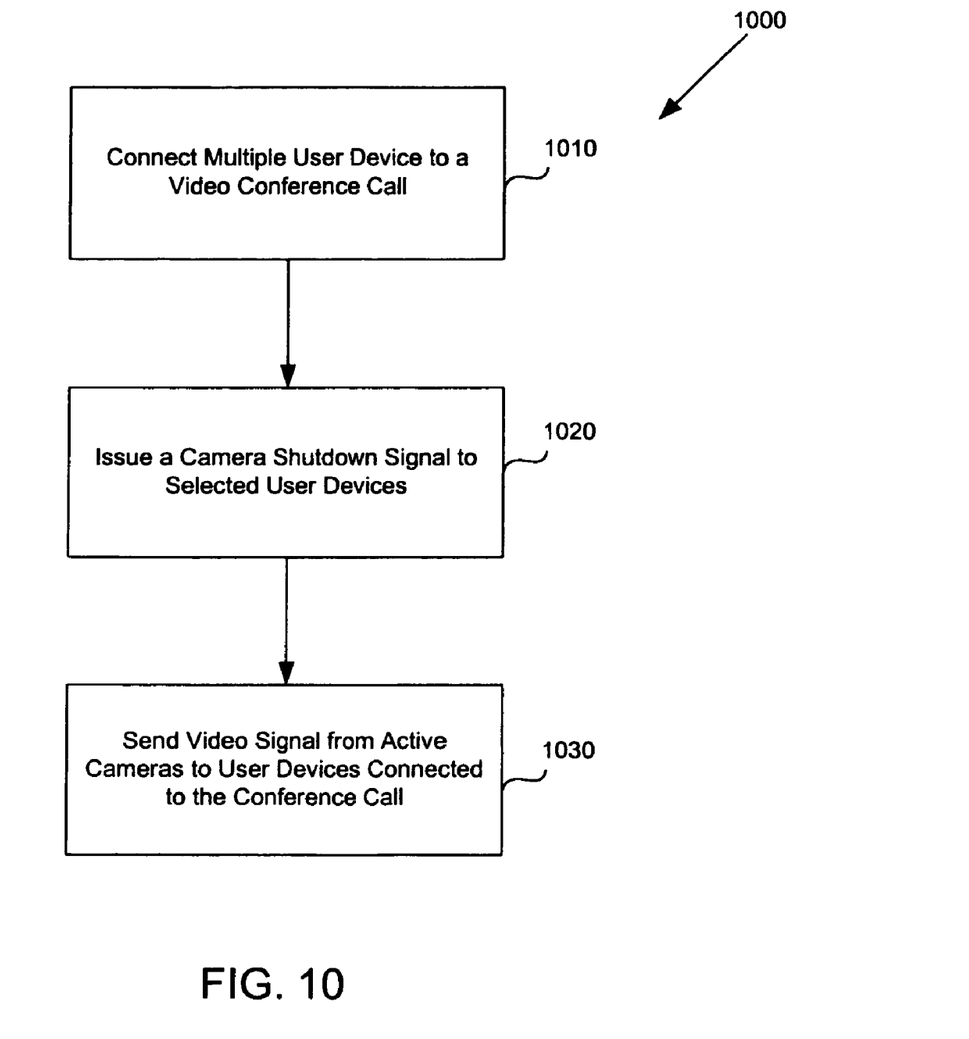
FIG. 10 is another exemplary process diagram of a method of managing bandwidth during a conference call.

Referring now to FIG. 10, another exemplary process 1000 is depicted. Process 1000 is representative of a method of conserving communications bandwidth during a videoconferencing call that uses a plurality of mobile devices. Each mobile device has or is coupled to a camera for videoconferencing. In the embodiment depicted, mobile devices connect to a videoconferencing call (step 1010). As a particular participant in the video conference call wishes to take the lead in the videoconferencing call it may not be necessary to communicate video from all of the cameras to all of the devices. Accordingly, it may be desirable to conserve bandwidth by only communicating video from a mobile device of a particular user, for example a lead user. Therefore, a camera shutdown signal may be sent to selected user devices to shut down their cameras (step 1020). Once selected the cameras have been shut down, video signals may be sent from active cameras to user devices that are participants in the conference call (step 1030).

Figure 11:
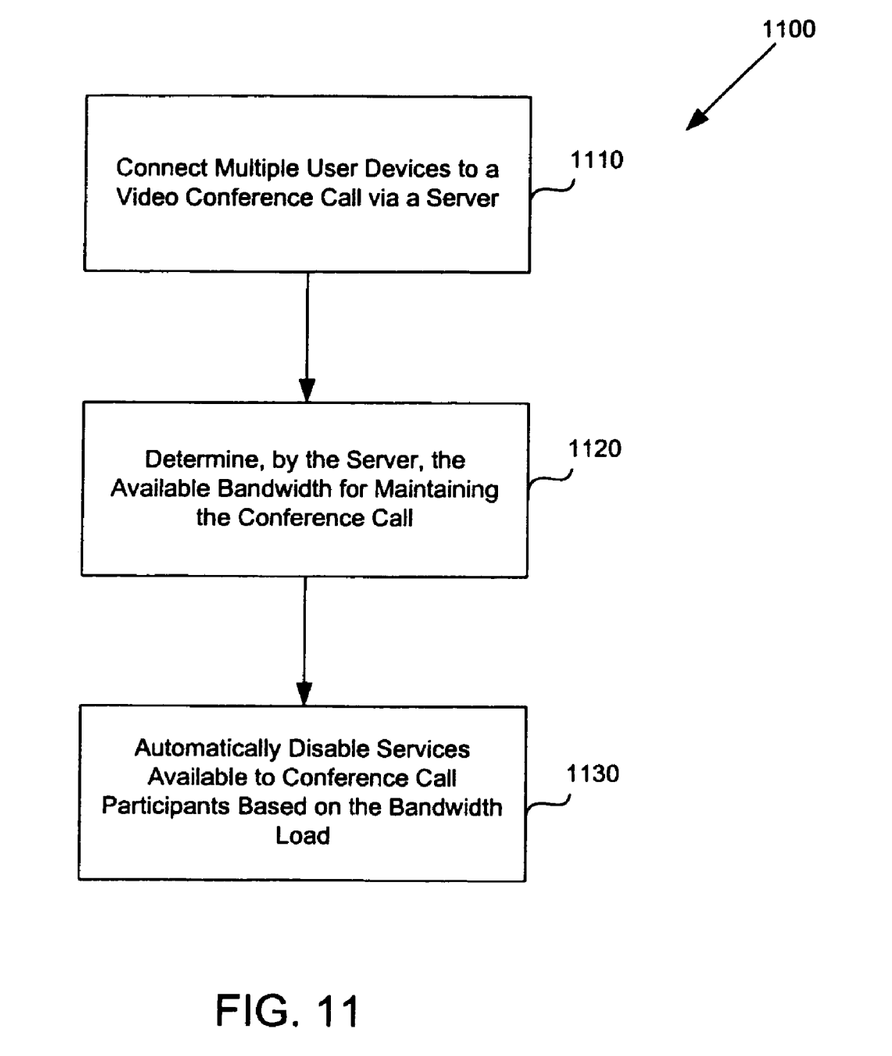
FIG. 11 is yet another exemplary process diagram of a method of managing bandwidth during a conference call.

In yet still another exemplary embodiment, a process 1100 is depicted in FIG. 11. Process 1100 is used to maintain a conference call with multiple mobile devices that are configured to communicate more than one data type over a bandwidth limited service. Multiple user devices, such as handheld computers are connected to a conference call via a server (step 1110). Once the conference call has been established and all participants are on line, the server determines the available bandwidth for maintaining the conference call (step 1120). If requests for services are not available due to bandwidth limitations or due to other limitations, services that are available to conference call participants may be selectively disabled automatically (step 1130). For example specific participants may have access disabled to specific data types. For example, if bandwidth is too limited, participants in a conference call may have video access disabled and, audio access may be only made available to conference call participants. In an exemplary embodiment, the order in which services are disabled may be made in a hierarchy. For example, because video may be the most bandwidth intensive and may also be the most unnecessary of services, video may be the first to be disabled in the hierarchy. Further, in an exemplary embodiment, the user of a handheld device may be able to control the data types being used if the user is not satisfied with the present quality of service of the data types being received. For example, if video service is seen as jerky or undesirable in other ways, video service may be manually dropped by toggling icon 154, thereby disabling video service while maintaining other services, such as but not limited to audio. Such manual control by the user has an effect of conserving bandwidth.

An exemplary embodiment may utilize, be executed by, and/or be applied in a handheld computer including a processor such as but not limited to a Dragonball processor running at clock speeds of 33 MHz, 66 MHz, or other clock speeds, the Dragonball processor being available from Motorola Inc. of Schaumburg, Ill. An exemplary handheld computer may also include, but is not limited to, four (4) megabytes (MB) of flash read only memory (ROM) for storing BIOS information, operating system information, and other information. The flash ROM may be used to store, but is not limited to, any of a number of versions of the Palm operating system (OS) available from Palm, Inc. of Santa Clara, Calif. Further, an exemplary handheld computer may also include, but is not limited to, thirty-two (32) MB of synchronous dynamic random access memory (SDRAM) for storing program information, and other information to be used by the handheld computer. In an alternative embodiment, the handheld computer may also use a digital signal processor including an advanced RISC machine (ARM) processor available from Texas Instruments of Dallas, Tex. and may use, but is not limited to, a Linux based operating system.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of establishing a communications session for multiple mobile devices, comprising:
   establishing a communications session between the mobile device and a first conferencing server of a group of more than one conferencing servers;
   checking the load of the first server;
   determining whether the load of the first server is above a predetermined threshold;
   routing subsequent mobile devices to communicate through a second conferencing server from the group of conferencing servers, if the load of the first server is above a predetermined threshold; and
   communicating between the first and the second server such that mobile devices communicating with the first server are able to participate in the communications session with mobile devices communicating with the second server.

2. The method of claim 1, further comprising:
   establishing a communication link between the mobile device and an access point communicating with the first conferencing server.

3. The method of claim 2, wherein the communication link with the access point includes use of an IEEE 802.11 communications protocol.

4. The method of claim 2, wherein the communication link with the access point includes use of a Bluetooth communications protocol.

5. The method of claim 1, wherein the mobile device includes a handheld computer.

6. The method of claim 5, wherein the handheld computer includes an integrated camera.

7. The method of claim 1, wherein the subsequent mobile devices include handheld computers.

8. The method of claim 1, further comprising:
   coupling the mobile device to a synchronization cradle that is in communication with the first conferencing server.

9. The method of claim 1, wherein the conferencing servers are configured to facilitate videoconferencing between mobile devices.

10. The method of claim 9, wherein the conferencing servers are configured to facilitate communicating multiple data types during the conference call.

11. A method of conserving communications bandwidth during a videoconferencing call using a plurality of mobile devices, each mobile device being coupled to a camera, the method comprising:
    connecting multiple mobile devices to a videoconference call;
    issuing a camera shutdown signal to selected mobile devices via the videoconference call connections;
    deactivating specified mobile device cameras based on the camera shutdown signal; and
    sending video signals from mobile devices with active cameras to a plurality of mobile devices connected to the conference call;
    wherein the shutdown signal is sent in response to the detection of an audio input to one of the mobile devices.

12. The method of claim 11, wherein at least one of the mobile devices includes a handheld computer.

13. The method of claim 12, wherein the handheld computer includes an integrated camera.

14. The method of claim 11, wherein the shutdown signal is issued manually by a user of one of the mobile devices.

15. A method of maintaining a conference call with multiple mobile devices, each of the mobile devices configured to communicate more than one data type during the conference call, the method comprising:
connecting multiple mobile devices to a conference call through a conferencing server;
determining by the server, the available bandwidth for maintaining the conference call;
automatically disabling the access to specified data types by specified mobile devices according to the available bandwidth.

16. The method of claim 15, wherein the data file types include video data, audio data, and text data.

17. The method of claim 16, wherein the data file types includes application data.

18. The method of claim 15, wherein the data types are disabled in a hierarchical manner.

19. The method of claim 18, wherein the first type of data type to be disabled is video data.

20. A method of utilizing a mobile device in a videoconferencing session, the method comprising:
establishing a communication session between the mobile device and a number of communication devices;
communicating video to the mobile device; and
presenting the video on a display in the mobile device during the communication session;
determining by the server, the available bandwidth for maintaining the conference call; and
automatically disabling the access to video by specified mobile devices according to the available bandwidth.

21. The method of claim 20, further comprising communicating video using a camera in the mobile device to the number of communication devices.

22. The method of claim 20, further comprising communicating audio from the mobile device to the number of communication devices.

23. The method of claim 20, wherein establishing a communication session between a mobile device and a number of communication devices includes communicating a log-in signal from the mobile device to a videoconferencing center.

24. The method of claim 20, wherein establishing a communication session between the mobile device and a number of communication devices includes communicating a videoconferencing initiation signal to the mobile device and the number of communication devices.

25. The method of claim 20, further comprising communicating data during a videoconferencing session from the mobile device to the number of communication devices.

26. The method of claim 25, wherein the data includes a word processing document.

27. The method of claim 25, wherein the data includes presentation slides.

28. The method of claim 20, further comprising presenting a video display of participants to a videoconferencing session.

29. The method of claim 28, wherein all of the participants to the videoconferencing session are displayed at the same time.

30. The method of claim 28, wherein one participant to the videoconferencing session is selectively displayed at a time.

31. The method of claim 30, wherein the one participant in the videoconferencing session being displayed is a participant that is currently speaking.

32. A method of claim 30, wherein the participant displayed can be selected by the mobile device and the number of communication devices.

33. The method of claim 20, wherein the communications are established in an ad hoc manner.

34. The method of claim 20, wherein the communications are carried out over a fixed communications network.

35. A system for utilizing a mobile device in a videoconferencing session, the system comprising:
means for establishing a communication session between the mobile device and a number of communication devices;
means for communicating video and audio to the mobile device; and
means for presenting the video and audio at the mobile device during the communication session; means for determining by the server, the available bandwidth for maintaining the conference call; and
means for automatically disabling the access to video by specified mobile devices according to the available bandwidth.

36. The system of claim 35, further comprising means for selecting an audio option to set audio presentation conditions during the communication session.

37. The system of claim 35, further comprising means for selecting a video option to set video presentation conditions during the communication session.

38. The system of claim 35, wherein the means for establishing a communication session includes a means for an ad hoc networking.

39. The system of claim 35, wherein the means for establishing a communication session includes a means for connecting with a server.

40. A handheld system comprising:
a central processing unit (CPU); and
a storage device coupled to the CPU and having stored thereon information for configuring the CPU to:
establish a communication session with a number of communication devices;
communicate video and audio to the number of communication devices; and
present the video and audio during the communication session; and
issue a camera shutdown signal to selected communication devices in the communication session when a bandwidth usage threshold is being reached because of the communication session.

41. The handheld system of claim 40, wherein the CPU is further configured to selectively choose which of the number of communication devices from which to receive information during the communication session.

42. The handheld system of claim 40, further comprising a video camera coupled to the CPU and configured to, capture and communicate video to the number of communication devices.

43. The handheld system of claim 40, wherein the CPU is further configured to provide audio, video, and data options to a user.

44. The handheld system of claim 40, wherein the communication session is an ad hoc communication session.

45. The handheld system of claim 40, wherein the communication session is established via a server computer.

* * * * *